United States Patent [19]
O'Daniel

[11] Patent Number: 5,183,371
[45] Date of Patent: Feb. 2, 1993

[54] EXTENDABLE ROLLOFF TRAILER

[76] Inventor: Harold W. O'Daniel, 1018 N. Commercial Blvd., Arlington, Tex. 76017

[21] Appl. No.: 680,986

[22] Filed: Apr. 5, 1991

[51] Int. Cl.$^5$ ............................................. B60P 1/32
[52] U.S. Cl. .................................... 414/477; 280/656; 414/498; 414/786
[58] Field of Search .......................... 414/477–479, 414/482–455, 491, 498, 786, 534; 298/1 A, 22 R; 280/656, 789, 149.2, 407.1

[56] References Cited

U.S. PATENT DOCUMENTS

| | | | |
|---|---|---|---|
| 2,900,198 | 8/1959 | Patton | 280/656 X |
| 3,099,489 | 7/1963 | Johnson | 298/22 RX |
| 3,181,914 | 5/1965 | Humes | 280/149.2 X |
| 3,239,274 | 3/1966 | Weiss | 280/656 X |
| 3,502,345 | 3/1970 | Hulverson | 280/656 X |
| 3,508,762 | 4/1970 | Pratt | 280/407.1 X |
| 3,847,405 | 11/1974 | Pearce | 280/656 |
| 4,033,625 | 7/1977 | Fikse | 280/656 X |
| 4,128,258 | 12/1978 | Johnson | 280/656 |
| 4,286,797 | 9/1981 | Mekosh, Jr. et al. | 280/149.2 |
| 4,561,671 | 12/1985 | DeWitt et al. | 280/656 X |
| 4,568,235 | 2/1986 | Bills, Jr. | 280/656 X |
| 4,580,805 | 4/1986 | Bertolini | 280/656 X |
| 4,589,670 | 5/1986 | Sweetin | 414/483 X |
| 4,889,464 | 12/1989 | Self | 414/491 |
| 4,958,845 | 9/1990 | Parks | 298/22 R |
| 4,969,659 | 11/1990 | Ehrlich | 280/656 X |

*Primary Examiner*—David A. Bucci
*Attorney, Agent, or Firm*—Charles D. Gunter, Jr.

[57] ABSTRACT

An extendable rolloff trailer is shown which includes a main frame having rear wheel assembly for supporting the trailer for movement over a surrounding terrain. The trailer also includes an extendable frame having a rear portion which is telescopingly engaged by the main trailer frame and having a front portion which is engaged with a tractor for pulling the trailer. A tilt frame is mounted on an upper surface of the main trailer frame and has an upper support surface for supporting a load bearing container. By locking the front end of the container to the extendable frame, the frame can be extended to redistribute the container load toward the center of the extended trailer. The trailer tilt frame can also be pivoted to tilt the associated container about a pivot to discharge the container load.

6 Claims, 2 Drawing Sheets

EXTENDABLE ROLLOFF TRAILER

BACKGROUND OF THE INVENTION

1. Field of the Invention

The present invention relates generally to the transportation of goods in containers by truck and, more specifically, to an adjustable tractor trailer chassis that is extendable to redistribute a container load during transit and which tilts to discharge a container at a destination point.

2. Description of the Prior Art

Shipping containers are widely used at the present time for the transportation of freight goods. Containers are commonly routed from a factory to a train terminal or shipping dock by truck, removed from the truck and placed on a railroad flat car or into a ship's cargo hold, transported to a destination point, and then placed on another truck for further distribution.

Such containers can be quickly and efficiently secured to the truck chassis by means of standard locking bolts. Containers offer the advantage of securely packing goods and avoiding excessive handling which advantages cannot be obtained in the case of open packaging.

Shipping containers are generally available in various sizes ranging from about 20 to 40 feet in length. For transport by truck, each container generally requires a truck chassis of a corresponding length. Various local, state and federal regulations, including bridge laws, determine the maximum gross weight which is allowed for a given length trailer. The larger the container, the larger the trailer required. Larger trailers have a number of disadvantages, however, including increased cost and the fact that the longer chassis is difficult to handle and maneuver, especially in congested urban traffic.

A need exists, therefore, for a trailer which is economical to manufacture and which has a chassis which is simple to adjust for altering its length to accommodate longer and shorter loads.

A need also exists for a trailer which is extendable to redistribute the load of a container to the approximate midpoint of the trailer chassis whereby a greater total payload weight can be accommodated.

A need also exists for an extendable trailer which can be extended to carry an increased load and yet meet applicable bridge laws by being extended to a greater length.

A need also exists for such a trailer which can be extended to a greater length for transporting containers on state highways and yet which can be retracted to a shorter length for inner city hauling.

SUMMARY OF THE INVENTION

The extendable rolloff trailer of the invention includes a main trailer frame having a front end, a rear end and opposing sides which together define a support surface. The main trailer frame includes a rear wheel assembly for rotatably supporting the main trailer frame for movement over a surrounding terrain. The trailer also includes an extendable frame which has a rear portion which is telescopingly engaged by the main trailer frame and has a front portion which is adapted to be engaged by a pulling source, such as a tractor. A tilt frame is pivotally mounted on the support surface of the main trailer frame. The tilt frame has an upper, container support surface for supporting a load bearing container having a front end and a rear end. Locking means are provided for locking the front end of the container to the front portion of the extendable frame, whereby telescopic extension of the extendable frame with respect to the main trailer frame distributes the container load toward the center of the extended trailer.

Preferably, pivot means are provided for operably connecting the main trailer frame and the tilt frame for pivoting the tilt frame and its associated container about a pivot point located on the main trailer frame for discharging the container from the trailer at a destination point. Indexing means are also preferably provided for securing the extendable frame in a plurality of longitudinally spaced positions with respect to the main trailer frame, whereby the extendable frame can be secured in a selected spaced position with respect to the main trailer frame.

A method is also shown for redistributing the load of a container transport trailer of the type having a main trailer frame with a front end, a rear end and opposing sides which together define a support surface, the main trailer frame also including a rear wheel assembly for rotatably supporting the main trailer frame for movement over a surrounding terrain and having an extendable frame with a rear portion which is telescopingly engaged by the main trailer frame and a front portion which is adapted to be engaged by a pulling source. A load bearing container is first placed on the support surface of the main trailer frame. The front end of the container is then locked to the front portion of the extendable frame. The rear wheel assembly of the trailer can then be locked and the front portion of the extendable frame pulled with the pulling source, whereby telescopic extension of the extendable framed with respect to the main trailer frame distributes the container load toward the center of the extended trailer. At the destination point, the extendable frame can be telescopingly collapsed within the main trailer frame by reversing the procedure. By pivotally mounting a tilt frame on the support surface of the main trailer frame, the tilt frame can be actuated to pivot the associated container about a main pivot point whereby the container is tilted at an inclined angle with respect to the horizontal axis defined by the support surface of the main trailer frame to discharge the container from the trailer.

Additional objects, features and advantages will be apparent in the written description which follows.

DETAILED DESCRIPTION OF THE INVENTION

Figure 1:
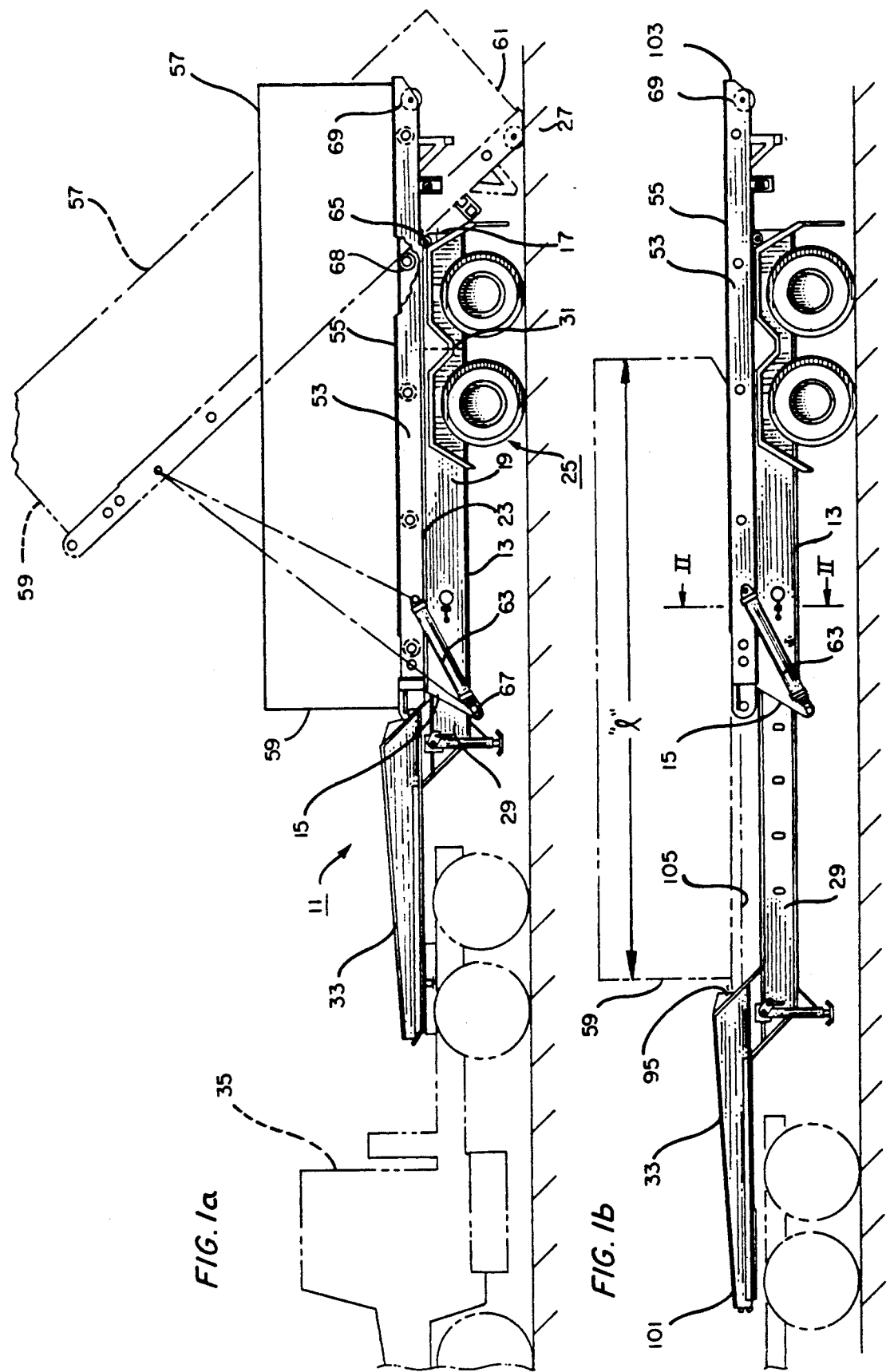
FIG. 1a is a side view of the extendable rolloff trailer of the invention in the retracted position showing the pivot means used to pivot the tilt frame and associated container between a transport position and a discharge position, shown in phantom lines.
FIG. 1b is a view similar to FIG. 1a showing the trailer chassis in the extended position with the container load being redistributed toward the center of the trailer.

FIG. 1a shows an extendable rolloff trailer of the invention, designated generally as 11. The rolloff trailer 11 includes a main trailer frame 13 having a front end 15, a rear end 17 and opposing sides 19, 21 (FIG. 2) which together define a support surface 23. The main trailer frame 13 also includes a conventional tandem, rear wheel assembly 25 for rotatably supporting the main trailer frame 13 for movement over a surrounding terrain 27.

An extendable frame 29 has a rear portion 31 (indicated by dotted lines in FIG. 1a) which is telescopingly engaged by the main trailer frame 13 and has a front, tongue portion 33 adapted to be engaged by a pulling source, in this case tractor 35, indicated in phantom lines in FIG. 1a.

Figure 2:
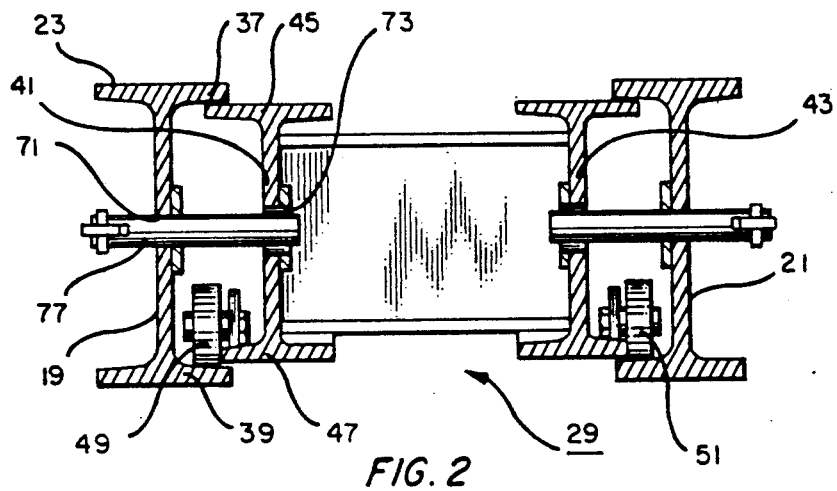
FIG. 2 is a cross-sectional view taken along lines II—II in FIG. 1b.

As best seen in FIG. 2, the opposing sides 19, 21 of the main trailer frame are fabricated 18 inch I-beams having upper and lower flanges 37, 39. The extendable frame also has opposite sides which are fabricated 16 ½ inch I-beams 41, 43. Each of the opposite sides 41, 43 of the extendable frame 29 has an upper and lower flange 45, 47 which is received within the mating flanges 37, 39 of the respecting opposing side of the main trailer frame 13. The opposite sides 41, 43 of the extendable frame are provided with a plurality of rollers 49, 51 which allow the extendable frame to be telescoped in a horizontal plane between the retracted position illustrated in FIG. 1a and the extended position illustrated in FIG. 1b.

The main trailer frame 13 can also be provided with a tilt frame 53 which carried by the support surface 23 of the main trailer frame and is pivotally mounted thereon. The tilt frame 53 has an upper, container support surface 55 for supporting a load bearing container 57 (FIG. 1a). The container 57 is of conventional manufacture having a front end 59, a rear end 61, a width and a length "1" (FIG. 1b) which generally approximates the length of the container support surface 55 of the tilt frame 53 in the embodiment shown in FIG. 1a.

Pivot means, in this case a pair of hydraulic cylinders 63 (shown in FIGS. 1a and 1b), are operably connected between the main trailer frame 13 and the tilt frame 53 on opposite sides of the main frame 13 for pivoting the tilt frame 53 and its associated container 57 about a main pivot point 65 located on the rear of the main trailer frame. Each of the hydraulic cylinders 63 is of conventional manufacture and includes an associated output shaft 67. A selected one of the cylinder 63 and shaft 67 is connected to the main trailer frame, the other of the cylinder and shaft being connected to the tilt frame 53 for pivoting the tilt frame and its associated container 57 through a maximum tilt angle of approximately 47° between the horizontal position indicated in FIG. 1a and the tilt position illustrated in phantom lines at which point the end roller 69 contacts the ground. In addition to the end roller 69, the tilt frame 53 is also provided with a plurality of rollers (indicated in dotted lines and partially broken away in FIG. 1a as 68) which extend at regularly spaced intervals along the length of the tilt frame, generally perpendicular to the longitudinal axis of the tilt frame. Moving the upper support surface 55 of the tilt frame 53 to the tilt position illustrated in phantom lines in FIG. 1a allows the container 57 to be rolled off the trailer and deposited at a destination location.

Figure 3:
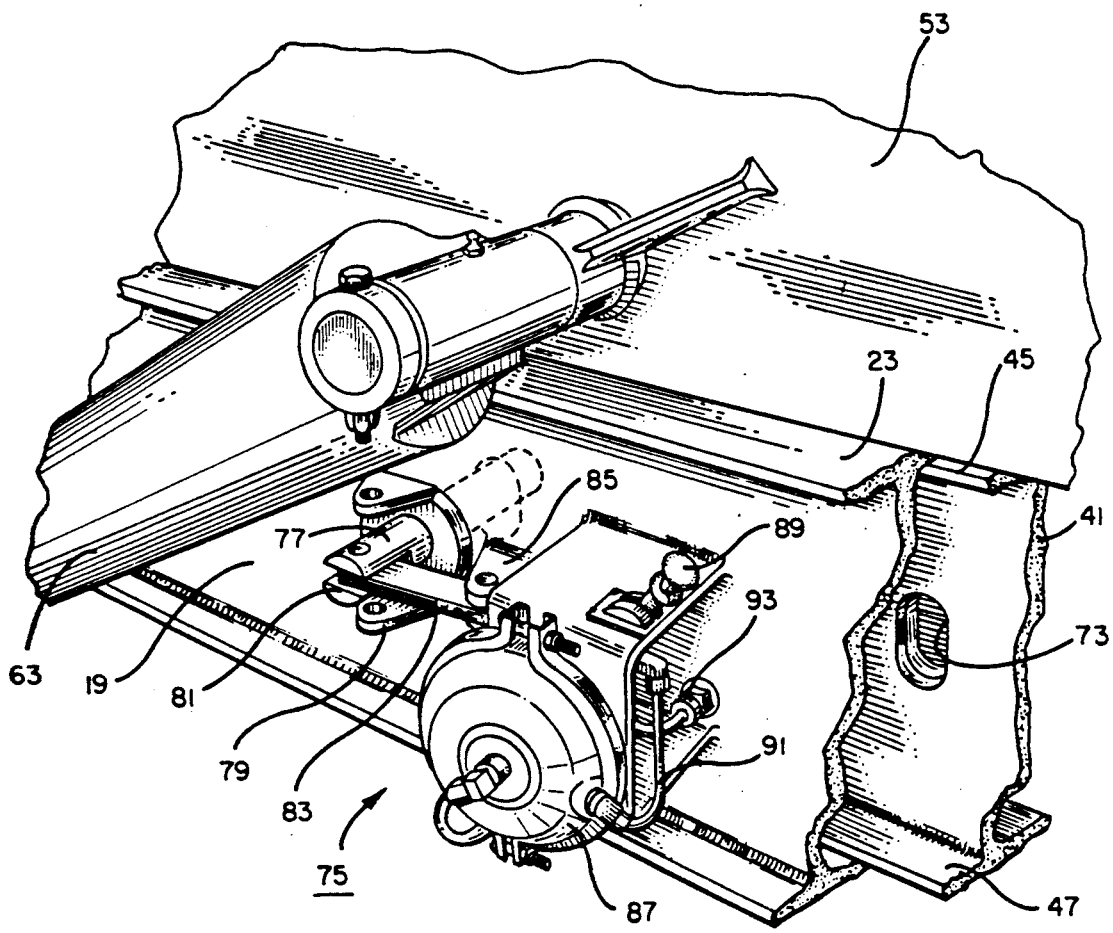
FIG. 3 is an isolated view, partly broken away of the indexing means used to secure the extendable frame in position with respect to the main trailer frame.

As shown in FIGS. 2 and 3, an indexing means is provided for securing the extendable frame 29 in a plurality of longitudinally spaced positions with respect to the main trailer frame 13. The indexing means includes a plurality of first apertures 71 provided in at least one of the opposing sides 19, 21 of the main trailer frame 13. The indexing means also includes a plurality of second apertures 73 (FIG. 2) in at least one of the opposite sides 41, 43 of the extendable frame 29. The second apertures 73 are axially alignable with the first apertures 71 as the telescoping, extendable frame 29 moves between the retracted position shown in FIG. 1a to the extended position shown in FIG. 1b, with respect to the main trailer frame 13.

The indexing means further comprises a pin mechanism 75 for engaging one of the first apertures 71 and one of the second apertures 73 to secure the extendable frame 29 in a selected spaced position with respect to the main trailer frame 13. In this case, the pin mechanism 75 includes a pin member 77 which is mounted generally perpendicular to the longitudinal axis of the opposing side 19 within a yoke opening 79. A clevice 81 provided on the outermost extent of the pin member 77 is coupled to a pivot arm 83 which passes through a pivot point 85 and has an inner extent which is coupled to a hydraulic power source 87. Actuation of the control lever 89 circulates hydraulic fluid through the respective intake and outlet lines 91, 93 to provide a source of pressure upon the inner extent of the pivot arm 83, thereby pivoting the arm about the point 85 to insert and retract the pin member 77 from the second aperture 73. Pivotal movement of the arm 83 thus provides selected engagement of the pin member 77 with the second aperture 73 to secure the extendable frame in a respective longitudinally spaced position with respect to the main frame 13.

As shown in FIGS. 1a and 1b, locking means are also provided for locking the front end 59 of the container 57 to the tongue portion 33 of the extendable frame 29, whereby telescopic extension of the extendable frame 29 with respect to the main trailer frame 13 distributes the container load of the container 57 toward the center of the extended trailer (see FIG. 1b). The locking means can be any convenient mechanism for securing the container front end 59 to the inner extent 95 (FIG. 1b) of the extendable trailer 29. In this case, a hook 97 is affixed to the container front end 59, as by welding, and engages a hook receptacle 99 provided on the inner extent 95 of the front tongue portion 33 of the trailer. The hook and hook receptacle 97, 99 secure the container to the tongue portion of the extendable frame and maintain the container 57 in a generally horizontal plane when the trailer is shifted to the extended position shown in FIG. 1b.

The operation of the extendable rolloff trailer of the invention in redistributing the load of a container will now be described. The container is initially loaded on the support surface 55 of the tilt frame 53 of the trailer in the position shown in solid lines in FIG. 1a. The front end 59 of the container 57 is also locked to the tongue portion 33 of the extendable frame by means of the hook and hook receptacle 97, 99. In the position shown in FIG. 1a, the shortened trailer frame increases the maneuverability of the trailer, which can be a significant advantage in congested, urban traffic. In the position shown in FIG. 1a, the tilt frame 53 can also be tilted between the horizontal position illustrated in solid lines and the tilt position illustrated in phantom lines to discharge the container 57 from the tilt frame at a destination point.

For travel on state highways, the trailer frame can be extended to the position shown in FIG. 1b, thereby significantly increasing the total payload weight which can be carried by the trailer in accordance with local, state and federal regulation. For example, in the retracted position, assuming a trailer weight of 16,000 pounds, and a tractor weight of 17,000 pounds, a gross weight of approximately 71,500 pounds is allowable for a total payload weight of 38,500 pounds. With the trailer in the extended position shown in FIG. 1b and the container weight evenly distributed between the front 101 and rear 103 of the trailer, assuming the same trailer weight and tractor weight, a gross weight of 80,000 pounds is allowable for a total payload weight of 47,000 pounds.

In moving from the retracted position of FIG. 1a to the extended position of FIG. 1b, the container 57 can conveniently be pulled forward in the direction of the tractor 35 by locking the brakes of the rear wheel assembly 25, thereby allowing the container lower surface 105 to roll on the rollers 68 of the tilt frame 53. The tilt frame 53 remains stationary during this operation. For inner city travel, the trailer can again be collapsed to the retracted position shown in FIG. 1a by reversing the above sequence of steps.

An invention has been provided with several advantages. The extendable rolloff trailer of the invention has the capability of redistributing a container load on a container transport trailer in order to increase the total allowable payload weight, for instance in interstate travel. For inner city transport, the trailer can be collapsed to a retracted position to increase the handling characteristics and maneuverability of the trailer. An indexing mechanism secures the extendable frame in any of a number of spaced longitudinal positions with respect to the main frame so that containers of various length can be centered on the extended trailer. The tilt frame of the trailer allows a container load to be dumped conveniently at a destination point.

While the invention has been shown in only one of its forms, it is not thus limited but is susceptible to various changes and modifications without departing from the spirit thereof.

What is claimed is:

1. An extendable rolloff trailer, comprising:

a main trailer frame having a front end, a rear end and opposing sides which together define a top support surface, the main trailer frame also including a rear wheel assembly for rotatably supporting the main trailer frame for movement over a surrounding terrain;

an extendable inside frame having opposite sides, a rear portion which is telescopingly received within the opposing sides of the main trailer frame and having a front, tongue portion for coupling with a pulling source;

a tilt frame pivotally mounted on the top support surface of the main trailer frame, the tilt frame having an upper, container support surface of a defined length for supporting a load bearing container of the type having a front end, a rear end, a width and a length which generally approximates the length of the container support surface of the tilt frame and wherein the tilt frame is provided with a plurality of rollers located generally coplanar with the upper, container support surface for supporting the load bearing container and for facilitating a discharge of the container from the trailer when the tilt frame is tilted from a horizontal position to an angular position with respect to the main trailer frame;

pivot means operably connected between the main trailer frame and the tilt frame for pivoting the tilt frame and its associated container about a pivot point located on the main trailer frame;

indexing means for securing the extendable frame in a plurality of longitudinally spaced positions with respect to the main trailer frame; and locking means for locking the front end of the container to the tongue portion of the extendable frame, whereby telescopic extension of the extendable frame with respect to the main trailer frame moves the trailer to an extended position which defines a center location between opposing ends of the extended trailer and wherein such telescopic extension redistributes the container load toward the center location of the extended trailer.

2. The extendable rolloff trailer of claim 1, wherein the indexing means comprises a plurality of first apertures in at least a selected one of the opposing sides of the main trailer frame and a plurality of second apertures in at least a selected one of the opposite sides of the extendable frame, the second apertures being axially alignable with the first apertures as the telescoping frame moves between a retracted position and an extended position with respect to the main trailer frame, the indexing means further comprising a pin mechanism for engaging one of the first apertures and one of the second apertures to thereby secure the extendable frame in a selected spaced position with respect to the main trailer frame.

3. The extendable rolloff trailer of claim 2, wherein the pivot means comprises at least one hydraulic cylinder of the type having an associated output shaft, a selected one of the cylinder and shaft being connected to the trailer main frame, the other of the cylinder and shaft being connected to the tilt frame for pivoting the tilt frame and its associated container about the pivot point located on the main trailer frame.

4. A method of redistributing the load of a container transport trailer of the type having a main trailer frame with a front end, a rear end and opposing sides which together define a support surface, the main trailer frame also including a rear wheel assembly for rotatably supporting the main trailer frame for movement over a surrounding terrain and having an extendable frame with a rear portion which is telescopingly engaged by the main trailer frame and a front portion adapted to be engaged by a pulling source, the method comprising the steps of:

pivotally mounting a tilt frame on the support surface of the main trailer frame, the tilt frame having an upper, container support surface for supporting a load bearing container wherein the tilt frame is provided with a plurality of rollers located generally coplanar with the upper, container support surface for supporting the load bearing container and for facilitating a discharge of the container from the trailer when the tilt frame is tilted from a horizontal position to an angular position with respect to the main trailer frame;

providing pivot means operably connected between the main trailer frame and the tilt frame for pivoting the tilt frame and its associated container about a main pivot point located at the rear end of the main trailer frame;

placing a load bearing container on the support surface of the main trailer frame;

locking a front end of the container to the front portion of the extendable frame; and locking the rear wheel assembly of the trailer and pulling the front portion of the extendable frame with the pulling source, whereby telescopic extension of the extendable frame with respect to the main trailer frame moves the trailer to an extended position which defines a center location between opposing ends of the extended trailer and wherein such telescopic extension distributes the container load toward the center position of the extended trailer.

5. The method of claim 4, further comprising the steps of:

telescopingly collapsing the extendable frame within the main trailer frame; and actuating the pivot means to pivot the tilt frame and its associated container about the main pivot point whereby the container is tilted at an inclined angle with respect to a horizontal axis defined by the support surface of the main trailer frame to discharge the container.

6. The method of claim 5, further comprising the steps of:

providing indexing means for securing the extendable frame in a plurality of longitudinally spaced positions with respect to the main trailer frame.

* * * * *